United States Patent
Cole et al.

[11] 3,880,400
[45]*Apr. 29, 1075

[54] DIAPHRAGM VALVE CARTRIDGE

[76] Inventors: George S. Cole, 300 E. Main St., Barrington, Ill. 60010; Richard L. Ritzenthaler, 530 Devonshire Ln., Crystal Lake, Ill. 60014; Don C. Arnold, 113 Cypress Ct., Palatine, Ill. 60067

[*] Notice: The portion of the term of this patent subsequent to June 12, 1990, has been disclaimed.

[22] Filed: June 8, 1973

[21] Appl. No.: 368,027

Related U.S. Application Data

[62] Division of Ser. No. 67,346, Aug. 27, 1970, Pat. No. 3,738,389.

[52] U.S. Cl............................ 251/155; 137/636.1
[51] Int. Cl........................................... F16k 11/14
[58] Field of Search ........ 137/607, 451, 525, 636.1, 137/636.4, 454.2, 454.5, 454.6; 251/331, 61.1, 153, 155

[56] References Cited
UNITED STATES PATENTS

| | | | |
|---|---|---|---|
| 2,688,342 | 9/1954 | Kehrer | 92/100 |
| 2,842,400 | 7/1958 | Booth et al. | 251/331 X |
| 3,166,500 | 1/1965 | Noakes et al. | 137/454.6 X |
| 3,190,312 | 6/1965 | Classen et al. | 251/331 X |
| 3,279,749 | 10/1966 | Fleckenstein et al. | 251/331 |
| 3,586,053 | 6/1971 | Browning | 137/636.4 |

FOREIGN PATENTS OR APPLICATIONS

| | | | |
|---|---|---|---|
| 1,015,290 | 9/1957 | Germany | 127/625.4 |

*Primary Examiner*—Martin P. Schwadron
*Assistant Examiner*—Richard Gerard
*Attorney, Agent, or Firm*—Hill, Gross, Simpson, Van Santen, Steadman, Chiara & Simpson

[57] ABSTRACT

A diaphragm valve cartridge for a faucet wherein a generally cylindrical valve body has a surface recess which receives at least one resilient valve member of rubber-type material of conforming size. An inlet port from a support duct and an outlet port to a discharge duct are located in the valve body recess in spaced relation with the recess walls and bottom engaged by the valve member. A retainer holds the valve member in the recess and applies sufficient pressure on the marginal portion of the valve member to establish a liquid-proof seal between the valve member and valve body which exists at least at low liquid pressure. The resilient valve member responds to liquid pressure within the valve, and the seal with the valve body is enhanced in proportion to liquid pressure, giving the valve a self-sealing characteristic over a wide range of liquid pressures. A movable actuator has a cam surface which positions the resilient valve member in relation to the inlet port, closing the port in one position, and in other positions varying the spacing between the valve member and port for varying the rate of flow through the valve. The various parts of the valve, including the actuator, are preassembled economically, and the valve is installed at the point of use as a unit, thereby avoiding any installation step, such as conventional compression seal, which might permit leakage in the valve.

The disclosed valve has two supply lines, and when one of these is externally blocked, the valve operates as a single supply line valve. The liquid handled by the valve flows from the supply duct to the discharge duct without traversing a region within the valve cartridge from which leakage is possible as a result of abuse or improper installation.

Valves embodying the invention easily can be installed by the user without tools of any kind, and the structure involved in installation is such that leakage at the couplings for the supply and discharge lines is virtually impossible.

23 Claims, 23 Drawing Figures

DIAPHRAGM VALVE CARTRIDGE

RELATED APPLICATIONS

This application is a division of our copending application, Ser. No. 67,346, filed Aug. 27, 1970, U.S. Pat. No. 3,738,389, which is incorporated herein by reference.

BACKGROUND OF THE INVENTION

This invention relates to a diaphragm valve or valve cartridge for liquids such as water, and more particularly to diaphragm valves or faucets designed mainly for household use in kitchen, lavatory and bathroom.

The diaphragm valve mechanism of the invention is usable both in a valve or faucet for a single supply line and in a mixing and proportioning valve or faucet for two supply lines.

SUMMARY OF THE INVENTION

The invention contemplates a diaphragm valve for liquids which is relatively inexpensive to manufacture, and capable of proper installation by the user. The valve requires virtually no maintenance, and possesses an extended life expectancy. It operates without loss of function over a wide range of fluid pressures.

The valve of the invention is virtually leak-proof, and is insensitive to foreign matter in the liquid. Further, the valve is not subject to water hammer, or other shortcomings of the valves in use at the present time.

Although various materials may be used in the valve of the invention, the valve is particularly suited to the use of modern plastic materials which are chemically inert, and subject to economical manufacture and assembly. Such materials, even when used with thin sections, can be expected to have an almost endless life and to possess characteristics which avoid deteriorating wear under conditions of use.

The valve of the invention comprises a valve body having at least one recess therein, a supply duct and a discharge duct. The supply and discharge ducts respectively have inlet and outlet ports in the recess in spaced relation with the recess walls and the marginal portion of the recess bottom.

A resilient valve member of rubber-type material (rubber or suitable plastic) is contained snugly within the valve body recess, overlying the inlet and outlet ports, and preferably spaced from the inlet port except when sealed over the inlet port to close the valve. The perimeter and bottom margin of the valve member respectively engage the walls and bottom of the recess with a pressure relationship which provides a liquid-proof seal.

The bottom margin of the resilient valve member preferably is an integral continuous ridge which engages the walls and bottom of the recess. This ridge responds to liquid pressure within the valve, and the seal between the valve member and valve body is enhanced in proportion to the liquid pressure, thereby giving the valve a self-sealing characteristic over a wide range of liquid pressures.

A valve member retainer is mounted on the valve body and engages the valve member with sufficient pressure to establish a pressure relationship between the valve member and the walls and bottom of the recess which provides the liquid-proof seal between the valve member and valve body which exists at least at low liquid pressure.

The valve of the invention also includes a movable actuator which has a cam surface effective in one position of the actuator to cause the valve member to close the inlet port, and in other positions to permit variations in the spacing between the valve member and the inlet port, thereby varying the rate of flow through the valve. Bearing means having fixed relation with the valve body, in some instances being a part of the valve body, are provided for supporting and guiding the movable valve actuator in coaxial relation with the valve body.

The valve body recess which receives the resilient valve member is located in an exterior surface of the valve body. The valve body is generally cylindrical, and each recess, (one for each supply line) is in the cylindrical surface.

The valve cartridge has an actuator which surrounds the valve body and valve members, and is movable axially and rotatably to control at least the rate of flow. This actuator has an interior surface which engages the exterior bosses of each valve member and controls the spacing between each valve member and its aligned inlet port within the recess. This interior surface of the actuator is cylindrical in a longitudinal region which, when positioned axially to engage the valve member boss, causes the valve member to close the inlet port, preventing flow through the valve. The remaining interior surface of the actuator which engages each boss is a cam surface which, except for a longitudinal segment aligned with a segment of the cylindrical surface, is eccentric and tapers outwardly from the cylindrical surface, thus permitting variations in spacings between the valve member and the inlet port to control rate of flow through the inlet port.

The valve body has suitable guide means for maintaining the actuator in coaxial relation with the valve body. This guide means includes two longitudinally spaced bearing surfaces which are fixed with respect to the valve body, and two correspondingly spaced cooperating bearing surfaces on the actuator, one on the exterior of the actuator and the other on the interior of of the actuator. The cylindrical and cam surfaces of the actuator which engage each valve member are located between these longitudinally spaced bearing surfaces.

The guide means which provides one of the bearing surfaces for the actuator has the dual purpose of serving as the member which couples the valve to an associated mounting body. An adpater seal member of resilient material is contained snugly in a recess in this mounting body, and the aforesaid coupling guide means establishes engagement between the valve body and the adapter seal member which is effective to couple the parts together in leak-proof manner. The adapter seal member has resilient tubular portions received within tapering mouths of supply and discharge ducts in the valve body and mounting body, providing self-sealing connections.

In more detailed aspect, stop means are provided to limit the range of rotation of the actuator to about 180°, and means are also provided to limit the axial movement of the actuator. These stop means for limiting the rotational and axial movements of the actuator comprise interfering shoulders or the like on parts of the valve which have other and more primary functions.

The exterior surface of the actuator which bears on the guide means coupling member mentioned above has a plurality of circumferentially spaced longitudinal lands which engage interior walls of the coupling member, and the regions between the lands serve as reservoirs for a suitable lubricant which is effective to give adequate lubrication for an extended period. In addition, one of the lands is provided with a resilient boss which takes up slack, if any, and thus compensates for minor dimensional irregularities. The boss also cooperates to establish a desirable frictional relationship between the actuator and the guide means, preventing unwanted axial movement of the actuator due to liquid pressures.

The valve cartridge is wholly self-contained, that is, no part of the valve having a critical relationship with any other part of the valve needs to be mounted separately during installation in order to establish the critical relationship. The spaced bearings for the actuator both have fixed relation with the valve body, insuring that the actuator will have proper relation with the valve body and each resilient valve member. Further, the relationships between each inlet duct, valve body recess, outlet duct, valve body, each resilient valve member, valve member retainer and actuator are such that all possibility for leakage is avoided. There is no way, short of willful destruction, these relationships can be altered during the installation of the valve.

DESCRIPTION OF THE PREFERRED EMBODIMENT

Figure 19:
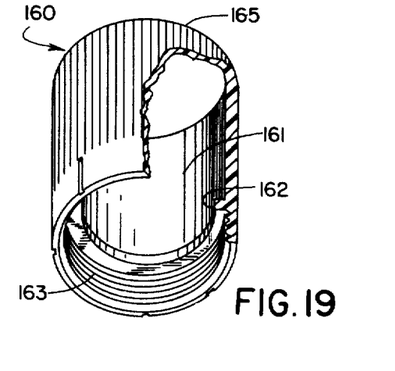
FIG. 19 is a perspective view, partly broken away, of the coupling member used in the valve shown in FIG. 1 for connecting the valve to the mounting body, the coupling member also serving as another guide and bearing means for the actuator.
Figure 20:
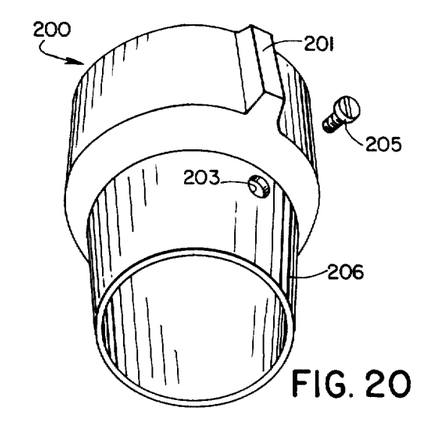
FIG. 20 is a perspective view of the handle used in the valve of FIG. 1.
Figures 21, 22:
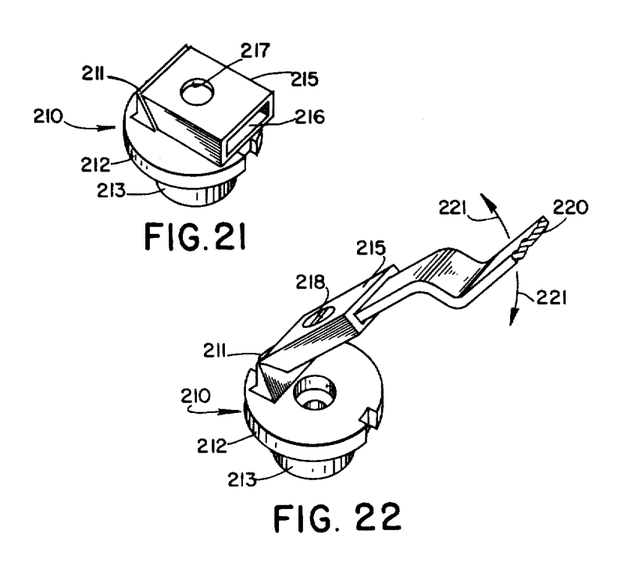
FIG. 21 is a perspective view of a modified stop cap usable in the valve of FIG. 1, the cap having a hinged portion shown closed.
FIG. 22 is another perspective view of the stop cap shown in FIG. 21, a portion of an actuating lever being shown mounted on the hinged portion, shown open.
Figure 23:
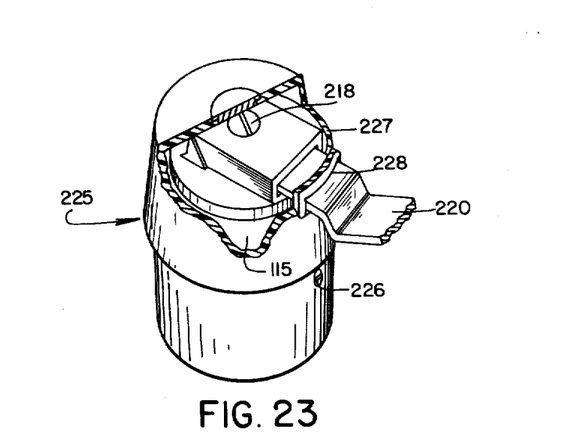
FIG. 23 is a perspective view, partly broken away, of the valve of FIG. 1 using the modified stop cap shown in FIGS. 21 and 22.

A double supply line valve embodying the invention is shown in FIGS. 11-20, and a modified structure for operating the valve is shown in remaining FIGS. 21-23. Although a double supply line valve is disclosed for use as a mixing or proportioning valve, it is apparent that the device may be used with a single supply with the other inlet blocked, whereby the structure disclosed herein with the other line may be considered redundant. In general, the valve which controls the rate of flow from each supply line in response to a single actuator utilizes a pair of the valve members described above. The valve is a wholly self-contained unit, and is subject to installation by the user without disturbing the assembly.

Figures 1, 2, 3:
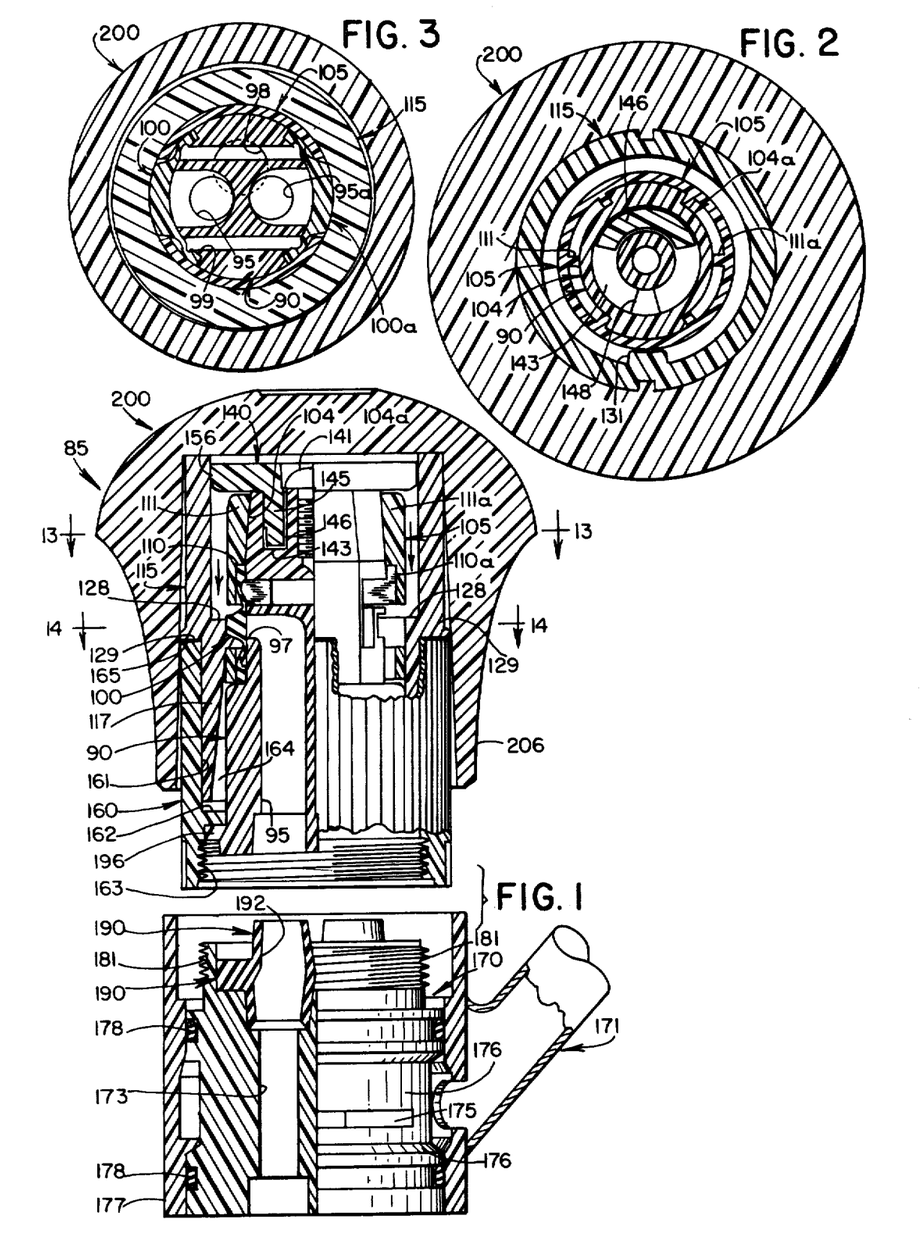
FIG. 1 is an exploded elevational view, partly in longitudinal section and partly broken away, of the second illustrated embodiment of the invention, namely, a valve for two supply lines which controls the rate of flow through the valve and proportions the flow from the two supply lines.
FIG. 2 is a transverse sectional view on line 13—13 of FIG. 1.
FIG. 3 is a transverse sectional view on line 14—14 of FIG. 1.

An assembled double line valve embodying the invention is shown in FIG. 1, and details of the various parts of the valve are shown in FIGS. 4-20. FIG. 1 shows the valve per se separated from an associated mounting body which includes a spout, shown by way of example as a swing spout commonly used in kitchen installations.

Referring to FIGS. 1-20, an exemplary double line valve embodying the invention is generally designated 85 in FIG. 1.

The valve 85 includes a valve body generally designated 90, and shown in greater detail in FIGS. 4 and 9-14. The valve body 90 is generally cylindrical in shape, although the surfaces thereof contain irregularities, as will be seen.

Figure 4:
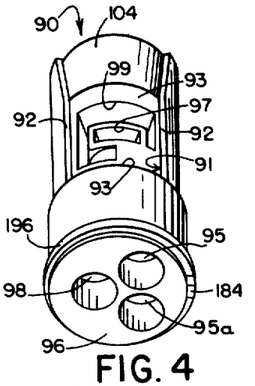
FIG. 4 is a perspective view of the valve body used in the valve of FIG. 1.
Figure 5:
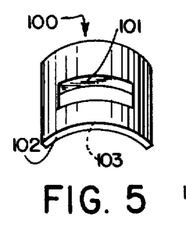
FIG. 5 is a perspective view of the resilient valve member used in the valve of FIG. 1.

Referring to FIG. 4, the valve body 90 has a pair of circumferentially spaced recesses, one of which is shown in FIG. 4 and designated 91. The other and similar recess is oppositely located on the body 90, and where illustrated is designated 91a. The recess 91 in the body 90 has three recess walls 92, and a recess bottom 93, the latter having the shape of a cylindrical segment. The fourth wall of the recess 91, as will be seen later, is a downwardly facing internal shoulder on a retainer member described below.

The valve body 90 also has a pair of supply ducts 95, 95a, arbitrarily called cold water duct 95 and hot water duct 95a, leading from the lower end 96 of the valve body to inlet ports in the recesses 91, 91a. Thus, the supply duct 95 terminates in an inlet port 97, preferably generally rectangular in shape in elevational view with the major dimension extending circumferentially of the valve body, located centrally of the recess 91, and the supply duct 95a similarly terminates in an inlet port 97a in the opposite recess 91a. A discharge duct 98 leads from the lower end 96 and branches within the valve body, terminating in a pair of outlet ports 99, 99a in and leading from the respective recesses 91, 91a. The outlet port 99 is larger in size than the associated inlet port 97. The lower ends of the ducts 95, 95a, 98 taper outwardly for coupling purposes, as better shown in FIGS. 9 and 14.

A pair of like resilient valve members 100 (FIG. 5), 100a (FIG. 6) are received snugly within the valve body recesses 91, 91a. These valve members are made of rubber-type material such as natural or synthetic rubber or plastic. The valve members 100, 100a have the general shape of a cylindrical segment, and each has a circumferentially elongated exterior boss 101, 101a. When the valve members are positioned in the recesses, the exterior bosses are aligned with the inlet ports 97, 97a from the supply ducts 95, 95a.

Figure 6:
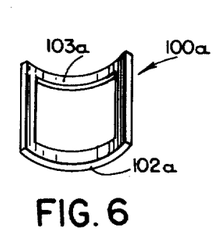
FIG. 6 is another perspective view of the valve member of FIG. 5.

The perimeter 102 and the bottom margin 103 of the valve member 100 respectively engage the walls 92 and the bottom 93 of the recess 91 with a pressure relationship providing a liquid-proof seal. As shown in FIG. 6 the perimeter 102, 102a and, the bottom margins 103, 103a of each valve member jointly form an integral continuous ridge which engages the walls and bottom of the associated recess. These ridges are responsive to liquid pressure within the valve and enhance the liquid-proof seals between the valve members and the valve body in proportion to the liquid pressure, thereby giving the valve a self-sealing characteristic.

A pair of portions 104, 104a (FIG. 4) of the valve body 90 between the recesses 91, 91a and the upper end of the valve body taper toward the body axis and widen circumferentially. The taper facilitates assembly of the valve body 90 with the resilient valve members 100, 100a and the valve member retainer described below. The tapering portions 104, 104a of the valve body 90 are aligned with downwardly facing shoulders on the valve member retainer, which shoulders constitute the fourth walls of the valve body recesses 91, 91a.

Figure 15:
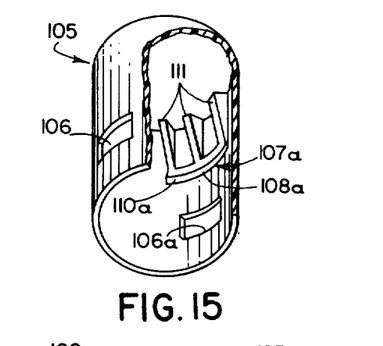
FIG. 15 is a perspective view, partly broken away, of the valve member retainer used in the valve of FIG. 1.

As shown in FIGS. 1-3 and 15, a valve member retainer 105 in the form of a generally cylindrical collar is mounted on the valve body 90 in overlying relationship with the valve members 100, 100a. As shown in FIG. 15, the valve member retainer 105 has a pair of oppositely disposed openings 106, 106a through which the bosses 101, 101a of the valve members extend. In spaced relation above the openings 106, 106a are a pair of bosses 107, 107a on the interior surface of the retainer 105. The boss 107a is shown in FIG. 15, comprising an arcuate portion 108a having a downwardly facing shoulder 110a, and a counterpart arcuate portion 108 with a downwardly facing shoulder 110 (FIG. 1) is diametrically opposite.

When the retainer 105 is positioned on the body member 90, as shown in FIG. 1, the shoulders 110, 110a have proper relation with the valve body recesses 91, 91a to form the fourth walls of the recesses, thereby providing recesses having four walls which properly contain and confine each valve member, giving the liquid-proof seal with the self-sealing characteristic between each valve member and the valve body.

As shown in FIG. 15, the bosses 107, 107a on the upper interior surface of the retainer 105 also include a pair of longitudinally extending portions 111, 111a which widen in radial dimension from bottom to top. The portions 111, 111a each include three circumferentially spaced projections, and the widening thereof from bottom to top is complementary to the aforesaid taper of the valve body portions 104, 104a. The portions 111, 111a engage the portions 104, 104a when the retainer 105 is assembled with the valve body 90, as shown in FIGS. 1 and 2.

The valve member retainer 105 engages each valve member 100, 100a with a pressure relationship cooperating to establish the pressure relationship between the valve members and the walls 92, 110, 92a, 110a and bottoms 93, 93a of the recesses 91, 91a in the valve body 90. In this manner the valve members 100, 100a are contained and confined within the valve body recesses so that liquid pressure within the valve body effectively may enhance the seals between the valve members and valve body in proportion to the liquid pressure, thereby giving the valve a self-sealing characteristic.

Figure 16:
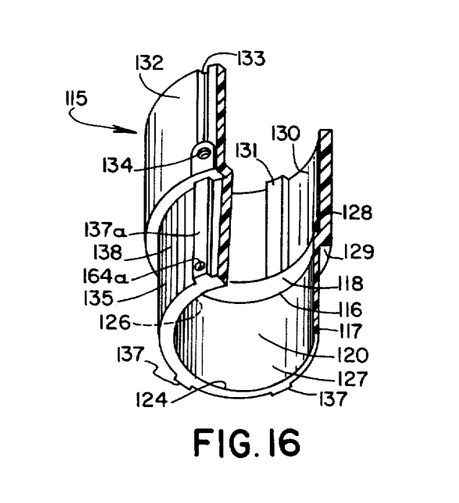
FIG. 16 is a perspective view, partly broken away, of the actuator used in the valve of FIG. 1.
Figure 17:
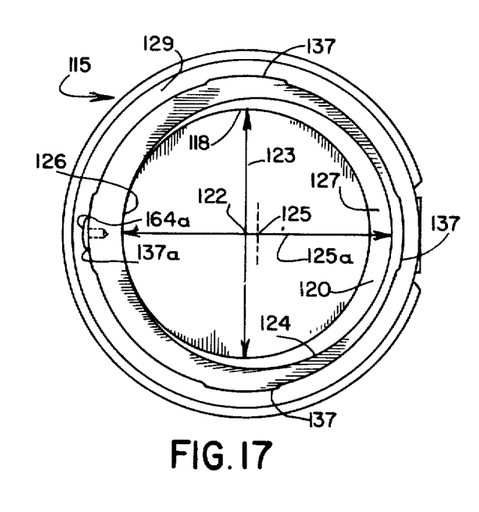
FIG. 17 is an enlarged bottom plan view of the actuator shown in FIG. 16.
Figure 18:
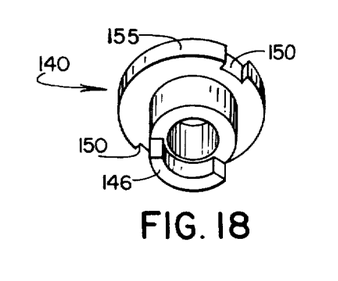
FIG. 18 is a perspective view of the stop cap used in the valve of FIG. 1, the stop cap serving both to limit rotation of the actuator and as a guide and bearing means for maintaining the actuator in coaxial relation with the valve body.

As shown in FIGS. 16 and 17, as well as FIGS. 1-3, an actuator 115, generally cylindrical in shape, surrounds the valve body 90, the valve members 100, 110a and the valve member retainer 105. The actuator 115 is movable axially and rotatably to control at least the rate of flow through the valve.

The actuator 115 has an interior surface which engages the exterior bosses 101, 101a of the valve members 100, 100a, this interior surface being in part cylindrical and in part a cam surface, as shown in detail in FIGS. 16 and 17.

A circular line 116 in FIG. 16 on the interior surface of the lower portion 117 of the actuator 115 is the dividing line between an upper cylindrical surface 118 and a lower cam surface 120. As best shown in FIG. 17, the cylindrical surface 118 is concentric with the axis 122 of the actuator, the vertical double arrow 123 through this axis or center 122 representing the diameter of the cylindrical surface 118.

In FIGS. 1 and 3, the actuator 115 is positioned axially so that cylindrical surface 118 engages the bosses 101, 101a of the valve members 100, 100a, the surface 118 distorting the valve members so the latter are sealed over the inlet ports 97, 97a. In this position of the actuator 115, the valve 85 is fully closed.

The lower cam surface 120 (FIGS. 16 and 17) of the actuator 115 is a generally divergent surface which connects the lower margin (line 116) of the upper cylindrical surface 118 with a longitudinally spaced lower circular portion 124 having a diameter larger than the double arrow 123 diameter of the cylindrical surface. The lower circular portion 124 is eccentric with respect to the cylindrical surface 118, the center 125 of the circular portion 122 being located on the double arrow 125a diameter which in FIG. 17 is at right angles to the double arrow 123 diameter of the cylindrical surface 118.

The left end of double arrow 125a bisects a segment 126 of the cam surface 120 which is generally aligned with a segment of the cylindrical surface 118, this segment 126 of the cam surface 120 when in engagement with the valve member 100, 100a being effective in the same manner as the surface 118 to distort and seal that valve member over its associated inlet port 97, 97a of the valve body 90, thus blocking the flow through that port. In view of the outwardly tapering shape of the surface 127 (FIG. 17) opposite the aligned segment 126, the other valve member tends to assume its undistorted shape and will be spaced from its associated inlet port by the distance permitted by the surface 127 of the lower cam surface 120. Thus, when one valve member is closed by the aligned segment 126 of the cam surface 120, the other valve member will be open to an extent depending on the axial position of the actuator 115.

When the actuator 115 is rotated on its axis away from the position where the aligned segment 126 of the cam surface 120 engages a valve member, there will be liquid flow through both inlet ports 97, 97a and both outlet ports 99, 99a, the proportioning of the respective flows being dependent on the angular or rotational position of the actuator, and the total volume of flow, or rate of flow, being dependent on the axial position of the actuator.

As shown in FIG. 16, the interior of the actuator 115 has an upwardly facing annular shoulder 128 more or less midway between the ends, which shoulder constitutes one element of a stop arrangement that limits the outward or upward axial movement of the actuator. A downwardly facing annular shoulder 129, also approximately midway between the ends of the actuator 115, constitutes one element of a stop arrangement that limits inward or downward movement of the actuator, as explained below.

The upper interior surface 130 (FIG. 16) of the actuator 115 above the upwardly facing shoulder 128 is cylindrical, and it is provided with one or more longitudinally extending bosses 131 which serves to key the actuator 115 to a rotatable stop cap which is described below. Also, the exterior upper surface 132 of the actuator 115 is cylindrical, and this surface has a pair of oppositely disposed longitudinal recesses 133 and 133a, which recesses serve to key the actuator 115 with a handle which also is described below. A pair of threaded openings 134, 134a is provided in the actuator 115 for receiving a set screw passing through the handle.

The lower exterior surface 135 of the actuator 115 is generally cylindrical in shape, the surface 135 preferably having a plurality of circumferentially spaced longitudinal lands 137 which cooperate to insure proper operation of the actuator 115. The lands 137 maintain friction and operational binding in the operation of the actuator 115 within desired limits. The lower exterior surface 135 of the actuator 115 between the lands 137 has a number of optional grooves 138 which serve as reservoirs for a lubricant.

As shown in FIGS. 1, 2 and 17, a stop cap 140 is rotatably secured to the upper end of the valve body 90 by suitable means such as a centrally located screw 141 (FIG. 1). The upper end of the valve body 90 has an annular recess 143, (FIG. 2), surrounding the screw 141, and the stop cap 140 has a downwardly extending tubular portion 145 received within this annular recess.

An arcuate stop boss 146 (FIGS. 2 and 17) extends downwardly from tubular portion 145 and terminates short of the bottom of the recess 143. An interfering stop boss 148 (FIG. 2) is provided at the bottom of the recess 143, and the bosses 146, 148 cooperate to limit the extent to which the actuator 115 may be rotated in either direction. The illustrated stop bosses 146, 148 are sized to permit actuator rotation through a range of about 180°.

The stop cap 140 has a pair of oppositely located peripheral recesses 150 (FIG. 18) which receive the longitudinal bosses 131 (FIG. 16) on the upper interior surface 130 of actuator 115. Thus, the stop cap 140 and the actuator 115 are keyed together for joint rotation, and the range of rotation is established by the interference between the boss 146 on the stop cap 140 and the boss 148 on the valve body 90.

In some situations it will be desirable to mount a pair of valves 85 in back-to-back relation, and it will be convenient to connect the hot water line to supply ducts on the same sides of the two valves and the cold water line to the supply ducts on the other sides of the valves. The opposing peripheral recesses 150 in the stop cap 140 permits the actuator 115 to be oriented in either of two positions, the positions differing by approximately 180°. Thus, in a back-to-back installation, the actuators 115 on the two valves may be given opposite orientation, whereby the two valves will operate properly despite non-uniformity as between the respective hot and cold water supply ducts, and without special parts.

An important feature of the invention relates to the means provided for guiding the actuator 115 in proper coaxial relation with the valve body 90. In the illustrated valve 85, two guide means are provided for the actuator 115, the two guide means being spaced axially to insure there will be no tilting and binding of the actuator 115 during operation.

One of the aforesaid guide means is the peripheral surface 155 (FIG. 18) of the stop cap 140 which is engaged by the upper interior cylindrical surface 130 (FIG. 16) of the actuator 115. The assembled relationship of the stop cap and actuator is shown in FIG. 1, the engagement between these two guiding and bearing surfaces being generally designated 156.

Two functions performed by the stop cap 140 have been mentioned, namely, cooperating to limit the range of rotation of the actuator 115, and providing one of the guide means for maintaining the actuator 115 in coaxial relation with the valve body 90. A third function performed by the stop cap 140 is to limit the outward axial movement of the actuator 115. This function is accomplished by interference between the upwardly facing shoulder 128 on the interior of the actuator 115 and the peripheral portion of the stop cap 140. As seen from FIG. 1, as the actuator 115 is moved upwardly, the shoulder 128 will engage the stop cap 140, preventing further upward movement.

As shown in FIGS. 1 and 19, a second guide means for the actuator 115, spaced axially from the stop cap 140, is a cylindrical sleeve 160 which, like the stop cap 140, performs three important functions in valve 85. As shown in FIG. 19, the cylindrical sleeve 160 has an upper interior cylindrical surface 161, an annular flange 162 below the cylindrical surface, and interior threads 163 below the flange 162. The functions of the flange 162 and the threads 163 is described below.

When the cylindrical sleeve 160 is assembled with the valve body 90, as shown in FIG. 1, the two are concentric, and the sleeve 160 surrounds the lower portion of the valve body 90 in spaced relation therewith. The lower portion 117 of the actuator 115 occupies the annular space 164 between the valve body 90 and the sleeve 160, the lands 137 on the exterior surface of the portion 117 having bearing relation with the interior cylindrical surface 161 of the sleeve 160. Thus, the actuator 115 is guided for axial and rotational movements in areas both above and below the valve members 100, 100a, and thus despite operational stresses on the actuator 115, the proper coaxial relation between the actuator and the valve body is maintained. The lands 137 on the actuator 115 and the lubricant in the areas between the lands cooperate to provide a desirable frictional relationship between the actuator 115 and the sleeve 160.

Dimensional or geometrical irregularities, if any, in the bearing surfaces of the actuator 115, the stop cap 140 and the coupling sleeve 160 tend to produce a slight non-concentricity between the actuator and the valve body 90, especially when the actuator is in valve-open positions. Thus, for example, when one inlet port is closed by action of the cylindrical surface 126 in the cam surface region 120, and the other port is open, forces on the actuator tend to shift or tilt the actuator slightly out of concentricity, allowing flow through the "closed" port. This condition, sometimes called cross flow, is objectionable.

While this condition might be avoided with close control of the dimensions of the parts (within the limitations of plastic molding), a more economical expedient is used, which at the same time produces additional important advantages. This expedient, therefore, permits the use of parts made with more relaxed tolerances.

Referring to FIGS. 16 and 17, the land 137a on the exterior surface of the lower portion 117 of the actuator 115 carries an insert member 164a of resilient frictional material, such as relatively soft polyurethane, which member extends slightly above the surface of the land 137a (FIG. 17) and thus engages the interior surface 161 (FIG. 19) of the cylindrical sleeve 160. The member 164a serves to take up any slack existing between the actuator 115, the stop cap 140 and the cylindrical sleeve, and prevents objectionable shifting or tilting of the actuator 115 by forces acting on the actuator. Since the member 164a is located on the land 137a which is adjacent the cylindrical surface 126 of the cam surface, the surface 126 when positioned to close an inlet port is held in proper relation with the valve member, and cross flow is prevented.

The insert member 164a also cooperates to establish a desirable frictional relation between the actuator 115 and the cylindrical sleeve 160 which helps prevent unwanted axial movement of actuator 115 due to forces derived from the pressure of the liquid in the valve.

As shown in FIG. 1, the upper end 165 of the cylindrical sleeve 160 has interfering relation with the downwardly facing exterior shoulder 129 of the actuator 115, thereby providing a stop limiting the downward or inward axial movement of the actuator 115. The upper end 165 of the sleeve 160 and the shoulder 129 of the actuator 115 are shown in substantial engagement in FIG. 1.

Figure 8:
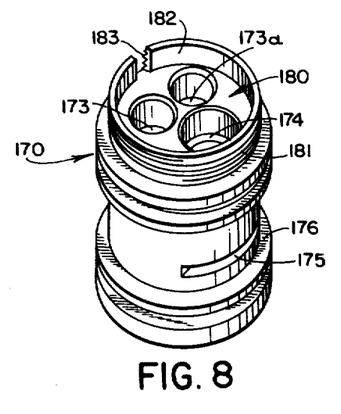
FIG. 8 is a perspective view of the mounting body used with the valve of FIG. 1.
Figure 9:
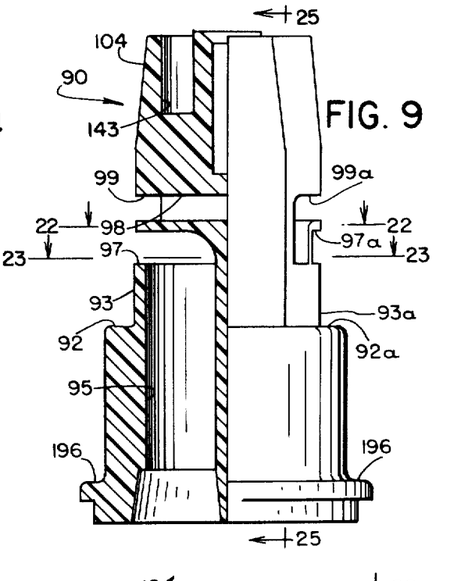
FIG. 9 is a side elevational view, partly in section on line 20—20 of FIG. 13, of the valve body of FIG. 4.
Figure 10:
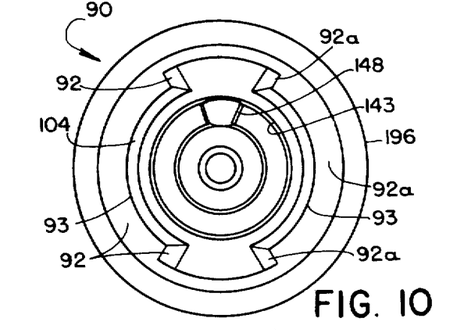
FIG. 10 is a top plan view of the valve body shown in FIG. 9.
Figure 11:
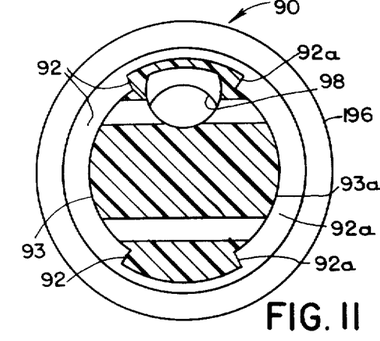
FIG. 11 is a transverse sectional view on line 22—22 of FIG. 9.
Figure 12:
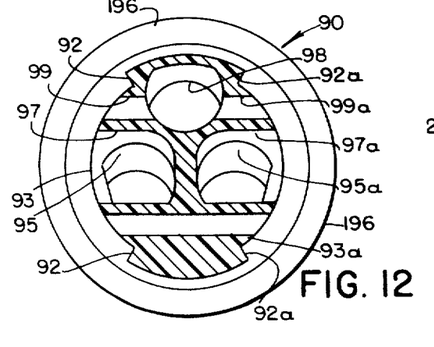
FIG. 12 is a sectional view on line 23—23 of FIG. 9.
Figure 13:
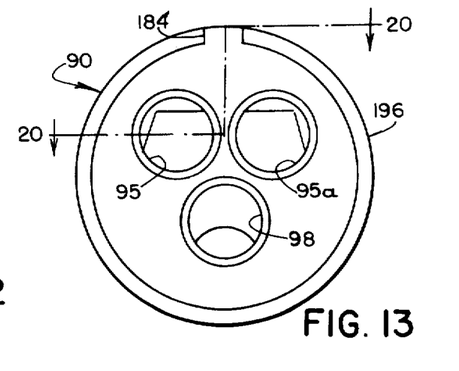
FIG. 13 is a bottom plan view of the valve body shown in FIG. 9.
Figure 14:
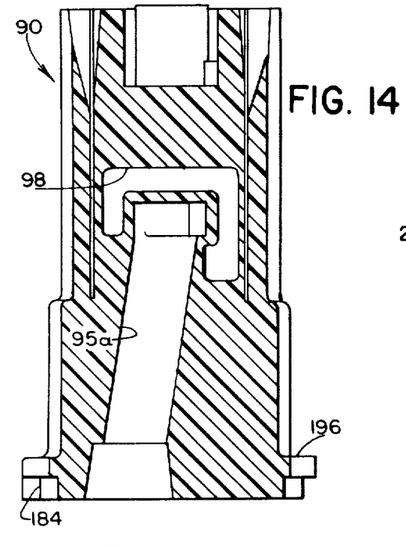
FIG. 14 is a longitudinal sectional view of the valve body taken generally on line 25—25 of FIG. 9.

In the lower portion of FIG. 1 and FIG. 8, a mounting body for the previously described parts of double line valve 85 is generally designated 170. A conventional swing spout 171 is shown in association with the mounting body 170 in FIG. 1, whereas in FIG. 8 the spout is omitted for clarity.

The mounting body 170 is generally cylindrical in shape and provided with a pair of internal supply ducts 173 and 173a and a discharge duct 174. The two supply ducts connect with supply lines in conventional manner, and the discharge duct 174 has an outlet port 175 in the bottom of an exterior annular recess 176 in the mounting body 170. The sleeve portion 177 (FIG. 1) of the spout 171 overlies the recess 176, and the space within the recess and the sleeve portion 177 constitutes a collection and mixing chamber for the liquid passing from the discharge outlet port 175 to the spout. Conventional O-rings 178 provide seals for this space and permit rotation of the spout 171.

The upper end of the mounting body 170 has a circular recess 180, the ducts 173, 173a, 174 terminating at their upper ends in this recess. The upper end portions or mouths of the respective ducts taper outwardly toward the upper ends, as best shown in FIG. 1. External threads 181 are provided at the upper end of the mounting body 170 for cooperation with the internal threads 163 of the cylindrical coupling sleeve 160. A lateral wall 182 of the recess 180 is relieved to provide a keyway 183 which receives a projection (FIG. 4) on the lower end of the valve body 90 to insure properly alignment between the valve body 90 and mounting body 170 when the two are coupled together.

Figure 7:
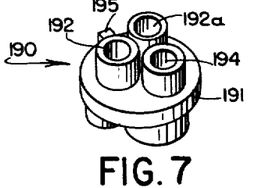
FIG. 7 is a perspective view of the resilient adapter seal member used to couple the valve of FIG. 1 to a mounting body, also shown in FIG. 1.

As shown in FIGS. 1 and 7, a resilient adapter seal member 190 of rubber-type material is disposed between the lower end of the valve body 90 and the mounting body 170. The adapter seal member 190 has a circular portion 191 snugly contained within the recess 180 of the mounting body 170, at least one supply duct 192, 192a and a discharge duct 194. The circular portion 191 has a radial projection 195 which also is received in the keyway 183 of the mounting body 170 to insure proper orientation. The respective ducts have upper and lower extensions integral with the circular portion 191 which respectively are received within the tapering mouths of the ducts 95, 95a, 98 of the valve body 90 and the tapering mouths of the ducts 173, 173a, 174 of the mounting body 170. The supply duct 192 of the adapter seal member 190 is shown in FIG. 1 in assembled relation with the supply duct 173 of the mounting body 170, and it will be understood that the other ducts have similar coupled relationships.

When the valve 85 per se is coupled to the mounting body 170 by engagement of the threads 163 on the cylindrical coupling sleeve 160 and the threads 181 on the mounting body 170, the threads are tightened in such amount that the lower end of the valve body 90 applies light pressure to the adapter seal member 190, whereby the respective ducts in the valve body 90, the adapter seal member 190 and the mounting body 170 are connected in leak-proof manner. The aforesaid pressure, of course, is transmitted from the internal flange 162 of the coupling sleeve 160 to an interfering external flange 196 (FIGS. 1, 8 and 14) at the lower end of the valve body 90.

FIGS. 1–3 and 20 show a handle 200 which is secured rigidly to the actuator 115 and thus is effectively a part of the actuator. The handle 200, as shown in FIGS. 1 and 20, is generally tubular in shape, and closed at its upper end which overlies the upper end of the actuator 115, the stop cap 140 and the valve body 90. An exterior projection 201 (FIG. 20) is optionally provided for convenience in indexing the rotational position of the handle 200.

The upper interior surface of the handle 200 may have a longitudinal rib (not shown) for keying into the longitudinal recess 133 on the upper exterior surface 132 of the actuator 115, and an opening 203 is provided in the lateral wall of the handle for a set screw 205 which engages the threaded opening 134 of the actuator 115. The skirt 206 of the handle 200 surrounds the region between the upper end 165 of the cylindricl coupling sleeve 160 and the actuator 115 for all axial positions of the actuator, thereby enhancing the appearance of the valve 85 in use.

A modified stop cap and handle providing operation of the valve by means of a lever are shown in FIGS. 21-23. Lever operation is particularly desirable in kitchen installations.

As shown in FIGS. 21 and 22, a modified stop cap 210 is formed of desirable plastic material with an integral hinge generally designated 211. A circular portion 212 and a downwardly extending sleeve 213 of the stop cap 210 are substantially the same as in the previously described stop cap 140 (FIG. 18) except that the stop boss 146 may be, and is shown, omitted.

The integral hinge 211, which constitutes plastic material of reduced cross section, connects the circular portion 212 with a coupling portion 215 which receives one end of an actuator lever 220. The coupling portion 215 has a recess 216 which receives the end of the lever 220, and an opening 217 for a screw 218 (FIGS. 22 and 23) which secures the lever 220 to the coupling portion 215. The hinge 211 permits the lever 220 to be moved up and down, as indicated by arrows 221 in FIG. 22.

As shown in FIG. 23, a modified counterpart handle 225 is mounted rigidly on the actuator 115 and secured by a set screw 226. A wall 227 of the handle 225 has an opening 228 through which the lever 220 extends. The handle 225 first is mounted on the actuator 115, and thereafter the lever 220 is passed through the opening 228 and secured within the coupling portion 215 of the stop cap 210. With this arrangement, the actuator 115 and the handle 225 are rotated for proportioning the flow from the two supply lines by moving the lever 220 from side to side, and the actuator 115 is moved axially for adjusting rate of flow by raising and lowering of the lever 220, the lever bearing alternately on upper and lower walls of the handle opening 228. The raising and lowering involves relative moment of the lever 220 with respect to the handle 225.

When the supply of water is shut off or blocked to one of the lines of the double line valve, the valve continues to function as a single line valve and the operative portions may be used as such.

From the above description it is thought that the construction and advantages of this invention will be readily apparent to those skilled in the art. Various changes in detail may be made without departing from the spirit or losing the advantages of the invention.

We claim as our invention:

1. A valve cartridge for a faucet, comprising:
   a. a generally cylindrical valve body having at least one recess in its exterior cylindrical surface and at least one supply duct and a discharge duct, said supply duct terminating in an inlet port in said recess and said discharge duct terminating in an outlet port in said recess, said inlet and outlet ports being in spaced relation with the walls of said recess;
   b. a valve member of rubber-type material in said recess and overlying said inlet and outlet ports therein, the perimeter and bottom margin of said valve member respectively engaging the walls and bottom of the recess with a pressure relationship providing a liquid-proof seal, said valve member having an exterior boss in alignment with the underlying inlet port, said valve member being responsive to liquid pressure within said valve body to enhance said seal between said valve member and said valve body in proportion to the liquid pressure, thereby providing a self-sealing characteristic;
   c. a valve member retainer mounted on said valve body and engaging said valve member with a pressure relationship cooperating to establish said pressure relationship between said valve member and the wall and bottom of said recess;
   d. an actuator surrounding said body and said valve member and movable axially and rotatably to control rate of flow, said actuator having an interior surface engaging the exterior boss of said valve member, said interior surface being cylindrical in a longitudinal region which, when positioned axially to engage said boss, causes said valve member to close said inlet port, the remaining interior surface for engaging said boss being a cam surface which, except for a longitudinal segment aligned with a segment of said cylindrical surface, is eccentric and tapers outwardly from said cylindrical surface to permit variations in spacing between said valve member and said inlet port and thus control rate of flow through said inlet port; and
   e. guide means on said valve body for maintaining said actuator in coaxial relation with said valve body.

2. A valve cartridge according to claim 1 wherein said bottom margin of said resilient valve member is an integral continuous ridge which engages said wall and bottom of said recess, said ridge being responsive to liquid pressure within the valve body.

3. A valve cartridge according to claim 1 wherein said cam surface of said actuator, except for said cylindrical longitudinal segment, is defined by the surface connecting said cylindrical surface to a longitudinally spaced circular portion having a diameter larger than the diameter of said cylindrical surface, said circular portion being eccentric with respect to said cylindrical surface, the center of said circular portion being located on a diameter aligned with the diameter of said cylindrical surface through said segment thereof.

4. A valve cartridge according to claim 1 wherein said resilient valve member, when undistorted by the cylindrical surface of said actuator, is in spaced relation with said inlet port, whereby said inlet port is open for flow therethrough.

5. A valve cartridge according to claim 1 wherein said valve member retainer is a cylindrical collar surrounding said valve body and said valve member, said collar having an aperture through which said boss of said valve member extends, said actuator surrounding said cylindrical collar.

6. A valve cartridge according to claim 5 wherein said collar has an interior shoulder which provides a wall of said valve body recess, the valve body portion aligned with said shoulder tapering in converging manner toward the upper end of said valve body, facilitating assembly of said valve member with said valve body and said collar.

7. A valve cartridge according to claim 5 having a stop cap detachably and rotatably secured to the upper end of said valve body, means on said cap and body limiting the rotation of said cap to less than one revolution, the diameter of said cap being larger than the outer diameter of said collar, said actuator having an upwardly facing internal annular shoulder of average diameter smaller than the diameter of said cap, whereby interference between said shoulder and said cap limits the outward axial movement of said actuator, and means keying said cap and actuator together for joint rotational movement, said guide means for maintaining said actuator in coaxial relation with said valve body including bearing engagement between an interior surface of said actuator and the perimeter of said stop cap.

8. A valve cartridge according to claim 7 in combination with an actuating lever pivoted to said stop cap, and a handle secured to said actuator, said lever extending through an aperture in said handle whereby said handle and actuator are moved axially by pivoting said lever and rotated by moving said lever from side to side.

9. A valve cartridge according to claim 1 in combination with a mounting body having at least one supply duct and a discharge duct, and wherein said guide means for maintaining said actuator in coaxial relation with said valve body includes a cylindrical sleeve surrounding longitudinal portions of said valve body, said actuator and said mounting body, said sleeve having an interior annular flange inwardly of the lower sleeve end, said valve body having an exterior annular flange adjacent the lower end thereof, said interior and exterior annular flanges interfering with each other whereby said cylindrical sleeve is adapted to couple said valve body to said mounting body, said actuator having bearing relation with the interior wall of said cylindrical sleeve.

10. A combination according to claim 9 wherein said cylindrical sleeve and said mounting body have cooperating coupling threads.

11. A combination according to claim 9 wherein said actuator has a downwardly facing exterior annular shoulder intermediate its ends, said shoulder being adapted to engage the upper end of said cylindrical sleeve to limit inward axial movement of said actuator.

12. A combination according to claim 9 wherein said longitudinal portion of said actuator received within said cylindrical sleeve has a plurality of circumferentially spaced longitudinal lands bearing on the interior wall of said sleeve, whereby friction and operational binding between actuator and sleeve are maintained within desired limits.

13. A combination according to claim 12 including a lubricant between said cylindrical sleeve and said actuator in the regions between said longitudinal lands.

14. A combination according to claim 9 including a resilient adapter seal member disposed between the lower valve body end and said mounting body, said adapter seal member containing supply and discharge ducts connecting with counterpart ducts in said valve and mounting bodies, said cylindrical sleeve in performing its coupling function applying sealing pressure to said adapter seal member whereby the respective ducts are connected in leak-proof manner.

15. A valve cartridge according to claim 1 having an insert member of resilient frictional material in the exterior surface of said actuator adjacent said interior cam surface, said insert member extending slightly above said exterior surface and into engagement with said guide means, serving to take up any slack existing between said actuator and said guide means, and insuring against axial movement of said actuator due to pressure of the liquid in the valve body.

16. A valve cartridge according to claim 15 wherein said insert member is located adjacent said interior cam surface containing said longitudinal segment aligned with a segment of said cylindrical surface.

17. A combination according to claim 12 having an insert member of resilient frictional material in a longitudinal land of said actuator, said land adjacent said interior cam surface containing said longitudinal segment aligned with a segment of said cylindrical surface, said insert member extending slightly above the exterior surface of said land and into engagement with the interior wall of said cylindrical sleeve, serving to take up any slack existing between said actuator and said cylindrical sleeve, thereby insuring against axial movement of said actuator due to pressure of liquid in the valve cartridge.

18. A valve cartridge according to claim 2 in which the valve body recess wall reacts against the outer perimeter of said ridge in res… …se to fluid pressure acting on an exposed inner perimete… …aid ridge which faces said ports.

19. A valve cartridge according to claim 1 in which said actuator is movably retained with respect to said valve body independently of said valve member retainer.

20. A valve cartridge according to claim 1 in which said actuator engages said valve member only at an area aligned with said inlet port.

21. A valve cartridge according to claim 1 in which said valve member retainer separates said valve member from said actuator throughout the extent of said valve member except for an area thereof aligned with said inlet port.

22. A self-attaching valve cartridge for a faucet mounting body, comprising:
 a. a generally cylindrical valve body with a valve seat therein, said valve body having at least one supply duct and a discharge duct communicating with opposite sides of said valve seat, all of said ducts extending through one end surface of said valve body;
 b. a valve member carried on said valve body in alignment with said valve seat and movable between open and closed positions;
 c. an actuator surrounding the other end surface of said valve body and rotatable thereon about the cylindrical axis and having an interior cam surface directly engageable with said valve member, said actuator being arranged to corotatably receive a knob thereon;
 d. said body, at the outer ends of said ducts, having an integral portion formed as one part of a slidably detachable fluid coupling for respectively mating sealingly with complemental structure on the mounting body having at least one supply line and a discharge spout; and
 e. means movably trapped on said valve body for detachably locking the valve cartridge to the mounting body.

23. A self-attaching valve cartridge according to claim 22 in which said valve body has a circumferential external flange surrounding said integral portion, and in which said locking means includes a sleeve rotatably carried on said valve body, said sleeve having a circumferential internal flange surrounding said integral portion by which flanges said sleeve is axially trapped on said valve body, said sleeve having screw threads surrounding said integral portion for manually detachably mating with screw threads on the mounting body.

* * * * *